United States Patent [19]

Jackson et al.

[11] Patent Number: 5,189,294
[45] Date of Patent: Feb. 23, 1993

[54] TRANSFORM LENS WITH A PLURALITY OF SLICED LENS SEGMENTS

[75] Inventors: John E. Jackson, Hazelwood; Joseph L. Levy, University City; Christopher C. Leung, Ballwin; Gordon H. Burkhart, St. Louis, all of Mo.

[73] Assignee: The United States of America as represented by the Secretary of the Air Force, Washington, D.C.

[21] Appl. No.: 910,466

[22] Filed: Jul. 8, 1992

[51] Int. Cl.$^5$ .............................. G01J 1/20
[52] U.S. Cl. .............................. 250/201.9; 356/121; 359/721; 359/724; 359/743
[58] Field of Search ........... 250/201.9, 201.2, 208.2, 250/216; 356/121, 359, 353; 359/721, 724, 742, 743, 708, 900

[56] References Cited

U.S. PATENT DOCUMENTS

| | | | |
|---|---|---|---|
| 3,594,075 | 7/1971 | Smith | 359/721 |
| 4,018,509 | 4/1977 | Boswell et al. | 350/160 LC |
| 4,019,807 | 4/1977 | Boswell et al. | 350/160 LC |
| 4,278,318 | 7/1981 | Nakayama et al. | 350/3.78 |
| 4,471,445 | 9/1984 | Pernick | 364/485 |
| 4,518,854 | 5/1985 | Hutchin | 250/201.9 |
| 4,722,594 | 2/1988 | Crossland et al. | 350/350 S |
| 4,923,262 | 5/1990 | Clay | 359/900 |
| 4,953,978 | 9/1990 | Bott et al. | 356/336 |

Primary Examiner—David C. Nelms
Assistant Examiner—Que T. Le
Attorney, Agent, or Firm—William G. Auton; Danald J. Singer

[57] ABSTRACT

A sliced transform lens is used to combine and focus the optical output signals of a planar M by N laser diode array onto M detector elements in a linear detector by displacing lens slices. A sliced transform lens is used to separate the composite image of the laser diode array on the detector plane into ten spots (400 emitters per spot) by displacing the lens slices relative to each other collimated He-Ne laser beam was used to examine the sliced transform lens and the linear detector array was used to measure the image sizes and the crosstalks between the images. The results show the minimum separation is approximately five detector spacings apart. The lens elements are cut from a bulk material (BK-7) and ground to desired thickness and parallelism. Then the elements are "glued" together with standard optical wax compound and ground to the prescribed focal length. THe lens slices are cut before grinding, hence the composite lens is symmetric and zero-curf configuration is preserved. This relaxes the collimation requirement of the incoming light to some extent. The lens is then polished and ready for application.

16 Claims, 1 Drawing Sheet

TRANSFORM LENS WITH A PLURALITY OF SLICED LENS SEGMENTS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to light emitting diodes, more specifically the invention pertains to a transform lens for use with laser diode arrays.

Coherent light can be defined as light in which all of the waves are of exactly the same frequency and exactly the same phase. Coherent light can act as a carrier, and can be modulated for the transmission of information.

The task of making linear and two-dimensional diode arrays emit coherent light is alleviated to some extent, by the systems disclosed in the following U.S. Patents, the disclosures of which are incorporated herein by reference, U.S. Pat. No. 4,018,509 issued to Boswell et al;
U.S. Pat. No. 4,019,807 issued to Boswell et al;
U.S. Pat. No. 4,278,318 issued to Nakayama et al;
U.S. Pat. No. 4,471,445 issued to Pernick;
U.S. Pat. No. 4,722,594 issued to Crossland et al; and
U.S. Pat. No. 4,953,978 issued to Bott et al.

SUMMARY OF THE INVENTION

The present invention includes a transform lens system that enables a linear array of M detector elements to sample and determine the optical characteristics of a two-dimensional planar array of M by N light emitting elements using: a beam splitter, a plurality of sliced lens segments, the linear array of detector elements, A/D converter elements and a computer.

The beam splitter splits the optical output signals of the planar array of light emitting elements to extract a sample for the sliced lens segments.

The heart of the invention is a transform lens formed by a plurality of sliced lens segments, each of which is aligned to capture and focus the optical output signals of a single column of light emitting elements, and outputting thereby M rows of focused optical signal spots, wherein each focused optical signal spot contains the optical output signals of N light emitting elements in a particular column.

The linear array of detector elements contains M detector elements that intercept and electrooptically convert one of the focused optical signal spots into an analog electrical signal. The collection of analog electrical signals produced by the linear array of detector elements can be measured by an oscilloscope or a computer to determine the optical characteristics of the rows of light emitting elements in the planar array.

The present invention can also be regarded as a two-step process that enables a linear array of detector elements to measure the optical outputs of a planar array of light emitting elements. The first step of the process entails combining all of the optical output signals of the rows of light emitting elements into a single combined beam for each column of the planar array. Next, the M combined optical signals are focused onto the linear detector array by the transform lens described above.

It is an object of the present invention to reduce the detector dynamic range requirement for the phase control loop of a two-dimensional laser diode array.

It is another object of the invention to allow simultaneous phase control of individual unit cells to speed up the phase alignment process.

These objects together with other objects, features and advantages of the invention will become more readily apparent from the following detailed description when take in conjunction with the accompanying drawings wherein like elements are given like reference numerals throughout.

DETAILED DESCRIPTION OF THE PREFERRED EMBODIMENT

The present invention includes a sliced transform lens for use with a planar array of light emitting elements. In order to understand the principles of the present invention, the reader's attention is directed towards FIG. 1.

Figure 1:
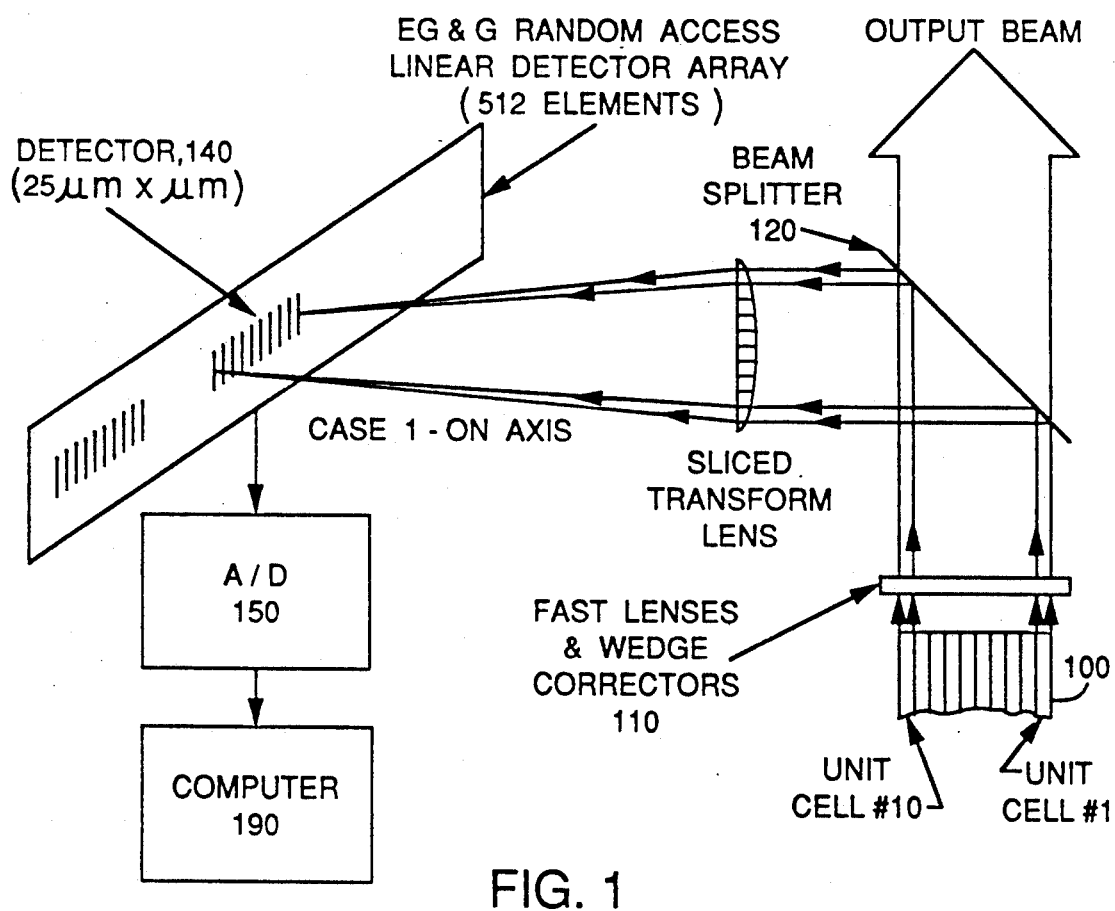
FIG. 1 is an illustration of the transform lens system of the present invention.

FIG. 1 shows a phase control system of a two-dimensional coherent laser diode array and the function of the sliced transform lens in the control loop. The system of FIG. 1 includes: a two dimensional laser diode array 100, optical lens elements 110, a beam splitter 120, a sliced transform lens 130, a linear detector array 140, and A/D converter 150, and a controlling computer 190.

The two dimensional laser diode array 100 of FIG. 1 includes 10 columns of laser diodes (with 400 rows in each column); which are individually controlled by the controlling computer 190 to produce laser outputs which have the same frequency and phase. Suitable emitters for use in the array are described in such standard texts as "Semiconductor Lasers and Heterojunction LED's" by E. Derniak et al, the disclosure of which is incorporated herein by reference.

The beam splitter 120 extracts a sample beam from the combined output of the laser diode array by splitting the output beam. This sample beam is a rectangular combined beam which contains the 4,000 outputs of the laser diodes in the laser diode array 100.

There exist a variety of schemes that could be used to sample the outputs of the laser diode array 100 to check for phase lock. One could measure all the individual outputs with a two dimensional detector array with 4,000 detector elements, for example. The present invention enables a one dimensional linear detector 140 to monitor the output of the 4,000 laser diodes using only 10 detector elements. This is possible with the sliced transform lens 130, which operates as described below.

The sliced transform lens 130 of FIG. 1 is a rectangular half convex lens which has 10 sliced lens elements (one for each column of laser diodes in the laser diode array 100). The lens material is not critical in that it may be made from conventional materials like glass, plastic, and quartz. Each sliced lens element is used to capture and focus all 400 laser beams emitted from a single column onto a single detector element in the linear detector array 140. Each detector element is able to receive a sample of the combined output of all of the laser diodes in a single column.

As discussed in the above-cited Derniak reference, the detector elements electrooptically convert the 10 combined optical beams into their electrical equivalents, and output 10 analog electrical signals to the A/D converter 150. The A/D converter 150 digitizes the 10 analog electrical signals into 10 separate digital signals, which are monitored by the computer 190 to determine if the outputs of the laser diodes are in phase with each other.

FIG. 1 is an illustration of two adjacent sliced lens elements (of the sliced transform lens 130 of FIG. 1) focusing column outputs onto two detector elements in the detector plane.

In the example of FIG. 1, the dimension of the entire lens is 12 mm ×21 mm. The composite lens is a plano-convex symmetric lens. Note the displacement between slices corresponds exactly to the separation between spots on the detector.

The alignment process is fairly simple. The equipments used include a micrometer, a window (substrate), a holding fixture, a collimated GaAs source and the linear detector array and supporting electronics. The first lens slice is used to focus the collimated light on the selected detector placed at the focal plane of the lens. A micrometer is used to perform the slight movement required during the alignment process. To ensure the lens is sitting against the window substrate, a pair of small tweezers are used to press the lens slice against the window momentarily. When the lens position is correct, optical cement is used to fix the position of the lens to the window substrate. The second lens slice can be placed on the first slice and the process is repeated. The spacing between the two images on the detector array can be monitored using an oscilloscope and the correct spacing can be obtained by moving the second lens slice with the micrometer. This procedure is repeated for the remaining slices. When the alignment is completed, transfer the assembly to the system of FIG. 1.

Figure 2:
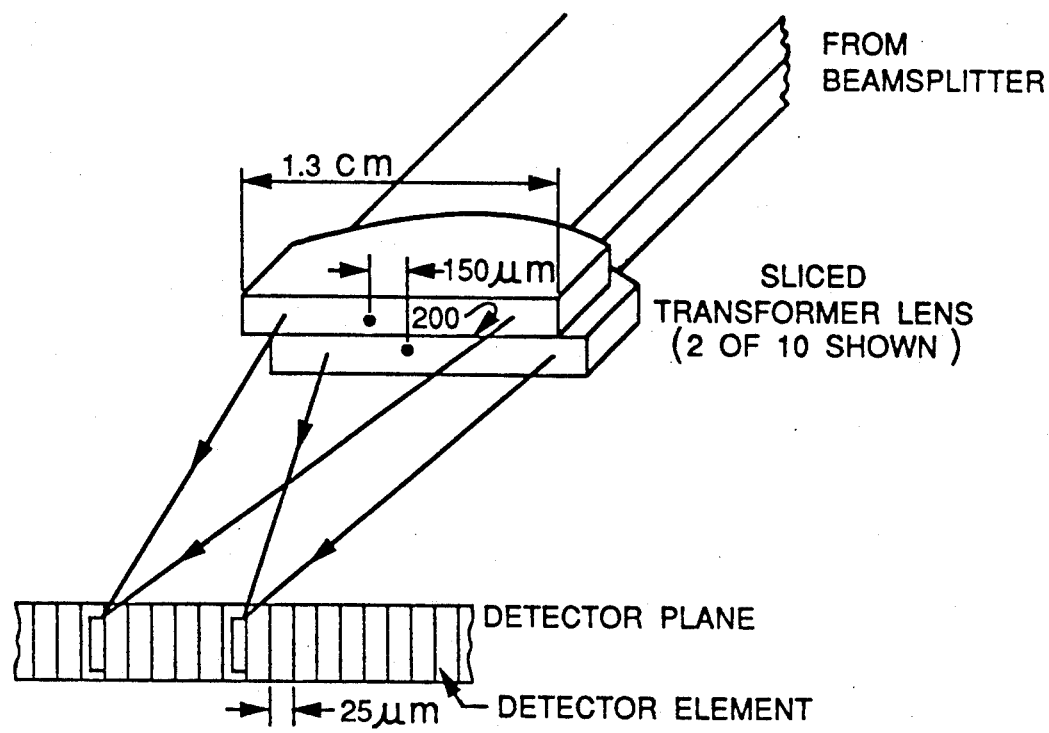
FIG. 2 is a close view of two adjacent sliced transform lens segments used in the transform lens of FIG. 1

In FIG. 2, optical cement 200 is used as a means for holding adjacent sliced lens elements in place. The use of optical cement is only intended as an example of a means for holding the lens slices, and other elements such as clamps or frames are also suitable. Similarly, the use of 4,000 laser diodes in a two dimensional array is only intended as an example. Any combination of optical emitters in a planar array can be used with the sliced transform lens of the present invention.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A transform lens for use with a planar array of light emitting elements, wherein said planar array includes N rows and M columns of light emitting elements, which each output of an optical output signal, wherein N and M are integers, wherein said transform lens comprises:
   a plurality of sliced lens segments, each of which is aligned to capture and focus the optical output signals of a single column of light emitting elements, and outputting thereby M rows of focused optical signal spots, wherein each focused optical signal spot contains the optical output signals of a N light emitting elements in a particular column; and
   a means for holding said plurality of sliced lens segments in place to collectively form said transform lens thereby.

2. A transform lens, as defined in claim 1, wherein said holding means comprises a plurality of layers of optical cement which are interleaved between adjacent sliced lens segments to hold them in place.

3. A transform lens, as defined in claim 1 which focuses the optical output signals of said planar array onto a linear detector array of M detector elements, wherein each sliced lens segment combines and focuses all of the output signals of the light emitting elements of a single column of said planar array onto one of the M detector elements.

4. A transform lens, as defined in claim 2 which focuses the optical output signals of said planar array onto a linear detector array of M detector elements, wherein each sliced lens segment combines and focuses all of the output signals of the light emitting elements of a single column of said planar array onto one of the M detector elements.

5. A transform lens, as defined in claim 3, wherein each detector element has a width of value W, and wherein each detector element is separated from an adjacent detector element by integral multiples of W.

6. A transform lens, as defined in claim 4, wherein each detector element has a width of value W, and wherein each detector element is separated from an adjacent detector element by integral multiples of W.

7. A transform process for use with a planar array of light emitting elements, wherein said planar array includes N rows and M columns of light emitting elements, which each output an optical output signal, wherein N and M are integers, wherein said transform process comprises:
   combining the optical output signals of all of the rows of light emitting elements in each column of the planar array to produce thereby M combined optical signals; and
   focusing the M combined optical signals onto a linear array of detector elements to enable characteristics said planar array of light emitting elements to be measured by M detector elements.

8. A process, as defined in claim 7, wherein said focusing step is performed by a plurality of sliced lens segments, each of which is aligned to capture and focus the optical output signals of a single column of light emitting elements, and outputting thereby M rows of focused optical signal spots, wherein each focused optical signal spot contains the optical output signals of a N light emitting elements in a particular column.

9. A transform lens system for use with a planar array of light emitting elements, wherein said planar array includes N rows and M columns of light emitting elements, which each output an optical output signal, wherein N and M are integers, wherein said transform lens system comprises:
   a means for extracting a sample of the optical output signals of said planar array of light emittinq elements to produce thereby samples of the optical output signals;
   a plurality of sliced lens segments, each of which is aligned to capture and focus the samples of the optical output signals of a single column of light emitting elements, and outputting thereby M rows of focused optical signal spots, wherein each focused optical signal spot contains the optical output signals of a N light emitting elements in a particular column; and a means for measuring the optical signal spots produced by said sliced lens segments to determine thereby characteristics of the optical output signals of planar array of light emitting elements.

10. A transform lens system, as defined in claim 9, wherein said measuring means comprises:

a linear array of M detector elements which intercept and electrooptically convert the M optical signal spots into M analog electrical signals;

A/D converter elements which convert said analog electrical signals into digital electrical signals; and a computer which receives and measures the digital electrical signals from the A/D converter elements.

11. A transform lens system, as defined in claim 9, wherein said extracting means comprises a beam splitter, which intercepts and splits the optical output signals of the planar array of light emitting elements to produce thereby the samples of optical output signals for the plurality of sliced lens segments.

12. A transform lens system, as defined in claim 10, wherein said extracting means comprises a beam splitter, which intercepts and splits the optical output signals of the planar array of light emitting elements to produce thereby the samples of optical output signals for the plurality of sliced lens segments.

13. A transform lens system, as defined in claim 9, including a means for holding said plurality of sliced lens segments in place to collectively form a transform lens thereby.

14. A transform lens system, as defined in claim 10, including a means for holding said plurality of sliced lens segments in place to collectively form a transform lens thereby.

15. A transform lens system, as defined in claim 11, including a means for holding said plurality of sliced lens segments in place to collectively form a transform lens thereby.

16. A transform lens system, as defined in claim 12, including a means for holding said plurality of sliced lens segments in place to collectively form a transform lens thereby.

* * * * *